US007402223B2

(12) United States Patent
Marks, III et al.

(10) Patent No.: US 7,402,223 B2
(45) Date of Patent: Jul. 22, 2008

(54) PRINTED ARTICLES AND METHODS AND SYSTEMS OF PRODUCING SAME

(75) Inventors: Pierce Marks, III, Augusta, GA (US); Michael W. Downing, White Bear, MN (US); Randy Ladwig, Suwanee, GA (US)

(73) Assignee: Innovative Adhesives, LLC, Graniteville, SC (US)

(*) Notice: Subject to any disclaimer, the term of this patent is extended or adjusted under 35 U.S.C. 154(b) by 102 days.

(21) Appl. No.: 10/959,020

(22) Filed: Sep. 30, 2004

(65) Prior Publication Data

US 2006/0068146 A1 Mar. 30, 2006

(51) Int. Cl.
*B32B 37/00* (2006.01)
*B32B 38/00* (2006.01)
*B32B 38/14* (2006.01)

(52) U.S. Cl. ........................ 156/247; 156/248; 156/250; 156/267; 156/272.2; 156/275.5; 156/277

(58) Field of Classification Search ................. 156/277, 156/247, 248, 250, 267, 272.2, 275.5, 307.1, 156/257

See application file for complete search history.

(56) References Cited

U.S. PATENT DOCUMENTS

| | | | | |
|---|---|---|---|---|
| 3,898,357 | A | 8/1975 | Miller et al. | 428/42 |
| 4,522,864 | A | 6/1985 | Humason et al. | 428/201 |
| 4,594,276 | A * | 6/1986 | Relyea | 428/42.1 |
| 4,636,551 | A | 1/1987 | Okaya et al. | |
| 4,863,801 | A * | 9/1989 | Vallarino | 428/414 |
| 4,906,526 | A * | 3/1990 | Inoue et al. | 428/473.5 |
| 5,939,142 | A | 8/1999 | Comiskey et al. | 427/256 |
| 6,038,977 | A * | 3/2000 | Haney et al. | 101/490 |
| 6,096,154 | A | 8/2000 | Comiskey et al. | 156/230 |
| 6,299,967 | B1 | 10/2001 | Collins et al. | 428/211 |
| 6,350,338 | B1 | 2/2002 | Comiskey et al. | 156/230 |
| 6,783,816 | B2 * | 8/2004 | Golub et al. | 428/32.12 |
| 2002/0040757 | A1 | 4/2002 | Comiskey et al. | 156/240 |

FOREIGN PATENT DOCUMENTS

WO PCTUS2005009704 3/2005

OTHER PUBLICATIONS

3M Product Specification #1526, Single Coated Medical Tape. Effective Date: Aug. 2, 1997.

3M Product Specification #1529, Monwoven Medical Tape. Effective Date: Aug. 2, 1997.

3M Material Safty Data Sheet Acrylate Adhesive, Backing Polyethylene, Silicone Liner; 3M Center; 55144-1000 Copyright 1997; Trade name: 3M Plastic Medical Tape 1526; ID Number/UPC: 70-0000-0579-6; Issued Feb. 24, 1997; Document: 06-7579-3.

(Continued)

*Primary Examiner*—Patricia L Nordmeyer
(74) *Attorney, Agent, or Firm*—Thomas, Kayden, Horstemeyer & Risley, LLP

(57) ABSTRACT

Printed articles are disclosed, where the article includes a transparent film, the film comprising a first side coated with a pressure-sensitive acrylate adhesive; and a second side printed with an image. The printed image can be produced with a digital or flexographic printed. Also disclosed are systems and methods for producing printed articles.

43 Claims, 1 Drawing Sheet

OTHER PUBLICATIONS

3M Medical Plastic Tape, Selection Guide, Jul. 2001.
Safety Datasheet for ICI Packaging Coatings; Product Name: Emicote 2 Waterbased Primer 601794; Revision Date: Nov. 14, 2002.
Emicote 2 Waterbased Primer, User's Guide, Feb. 2003.
Security Printing: A "how-to" guide for HP Indigo digital presses; 2003; 05397-00080.
White Paper: "Digital offset color vs. xerography and lithography"; internal HP document; no publication date.

* cited by examiner

PRINTED ARTICLES AND METHODS AND SYSTEMS OF PRODUCING SAME

TECHNICAL FIELD

The present disclosure is generally related to printed articles and methods and systems for producing printed articles, and more particularly, to printed decals and methods and systems of producing the same.

BACKGROUND

Certain portions of society have always desired more stylized or artistic decorations of the human body. The process of applying tattoos, though, is both painful and costly, and the image is permanent.

A number of tattoo imitations have been developed to give the appearance of detailed skin or body images without the permanency or pain involved with tattoos such as painted images, transferable dye images, and decal images. Painted images require the artistic efforts of a painter to provide a good quality image. Painted images provide an infinite variety of high quality images, but are relatively expensive.

For transferable-dye images, water-soluble or solvent-soluble dyes are usually painted on a substrate in a pattern or image. The wetted substrate with dyes is then pressed against the skin with a rubbing action, thus transferring the dyes to the skin. This method tends to produce streaked, smeared and partial images. Some of the dyes are water-soluble and will run and streak easily from perspiration or other liquids. Additionally, with water transferable temporary tattoos, it is necessary to have water available for the application thereof. They must be taken off by strong rubbing with alcohol, soap and water, baby oil, cold cream, or the like. By default, the water-transferable temporary tattoos have only one application or use.

Decal tattoo imitations comprise a printed image on a substrate with an adhesive material on the other side of the substrate. These decals tend to appear highly artificial. Currently available decal body tattoos have been successfully marketed for many years, but they appear little better than Band-Aid® Brand adhesive bandages with printed images on them.

Current temporary tattoos and decals utilize a variety of printing and imaging methods. They include, but are not limited to, flexography, lithography, rotogravure, screen printing, or combinations thereof. These printing and imaging methods require printing or imaging plates, cylinders, drums, screens, etc., which require cleanup and changing between different printed images. These printing and imaging methods have limitations on print image resolution such as Dots Per Inch (DPI) or Lines Per Inch or other such measurement of resolution or print clarity. The printed images from most of these printing and imaging methods are actually layers of ink/pigment from each printing or imaging plate, cylinder, drum, or screen in different stations in the printing or imaging process. The registration of these printed images is performed mechanically and/or visually by an operator or visual inspection methods or processes.

SUMMARY

Aspects of the present disclosure are generally directed to printed articles and systems and methods for producing printed articles. A representative printed article includes a transparent film, the film comprising a first side coated with a pressure-sensitive acrylate adhesive, and a second side printed with an image. Desirably, the printed image has a resolution in the range of about 300 to 812 dots per inch. The printed image can be produced from a digital or flexographic printer. The printers can be rotary-fed, instead of sheet-fed.

A representative method for producing the printed articles includes printing a first side of a transparent film, the film further including a second side coated with a pressure-sensitive acrylate adhesive. The method further comprising coating the first side with a coating before printing the first side, wherein the coating has a class transition temperature lower than that of ink applied during a digital printing process; curing the coating by a method chosen from: radiant heat, ambient air, forced air flow, and ultraviolet light; and heating and coating above its glass transition temperature during printing, whereby the coating bonds to ink dispersed in the printing process. Also disclosed are systems for producing printed articles. A representative systems includes a coating application apparatus, a printer in line with a coating apparatus, and a roll of adhesive tape roll disposed in proximity to the coating application apparatus and the printer, whereby adhesive tape is firstly fed from the roll into the coating application apparatus and secondly fed from the coating apparatus into the printer.

Other systems, methods, features, and advantages of the disclosed printed articles, systems, and methods will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale. Moreover like reference numerals designate corresponding parts throughout the several views.

DETAILED DESCRIPTION

Figure 1:
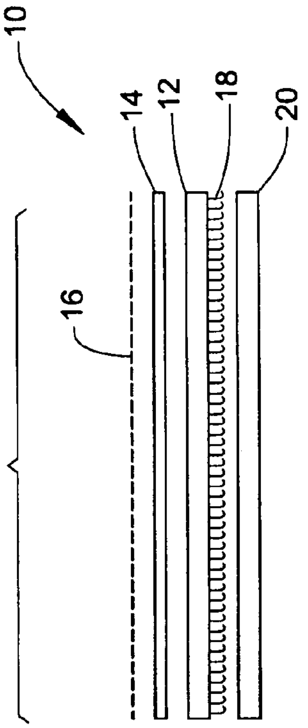
FIG. 1 is an exploded side view of an embodiment of the disclosed printed article.

The disclosed printed articles and/or temporary tattoos are printed on pressure-sensitive tape or film specially developed for contact with the skin. Specifically, the printed articles are printed on the non-tacky side of the tape by digital or flexographic printing. The pressure-sensitive tape in one embodiment is hypoallergenic. The use of the term "hypoallergenic" as used herein indicates a product that is non-sensitizing to the general public. The disclosed printed articles can be applied to a person's skin or any other solid surface such as glass, paper, wood, plastic for many purposes such as, for example, temporary tattoos, decals, surgical instructions, corporate advertising, camouflage, etc.

In one embodiment, the adhesive tape is a single-coated transparent polyethylene (PE) film or substrate, coated on one side with a pressure-sensitive acrylate adhesive. In an alternate embodiment, the adhesive tape is a nonwoven medical tape. The nonwoven medical tape includes, for example, rayon with a nonwoven backing coated on one side with a hypoallergenic pressure-sensitive acrylate adhesive. In other embodiments, the tape can include a transparent film, or substrate, that is polyester, polyurethane, ethylene vinyl acetate (EVA), coextruded EVA and white polyethylene, or a moisture vapor permeable plastic such as polyurethane plastic (PU) for incise tape and incise drapes. The tapes can be supplied on a polyethylene-coated paper liner, and/or with silicone coating on one side.

The hypoallergenic pressure-sensitive tape can be obtained from a variety of US and global sources such as, for example, 3M, Johnson & Johnson (J&J), Avery, Tyco, Scapa, Adhesives Research, Biersdorf, Smith & Nephew, BSN (joint venture between Biersdorf and Smith & Nephew), Nitto-Denko, etc. These hypoallergenic pressure-sensitive tapes are used in a variety of medical and surgical applications. These hypoallergenic pressure-sensitive tapes are usually tested for in vitro or in vivo skin irritation, in vitro or in vivo skin sensitization, as well clinical trials involving subjects/patients. These hypoallergenic pressure-sensitive tapes are, in one embodiment, but not limited to, Class II Medical Devices as defined by the Food, Drug and Cosmetic Act and its amendments or comparable international regulations. Temporary tattoos and/or decals utilizing hypoallergenic pressure-sensitive tape are safe for customers and patients to use, are easy to apply, and are easy to remove.

Specific examples of the tape that can be printed on to create the disclosed printed articles include, but are not limited to, Polyester Medical Tape without Liner 1516, Conformable Breathable Incise Tape 9948, Incise Tape 9830, Nonperforated EVA Medical Tape 1527-ENP, Polyurethane Medical Tape 9842, Single Coated Medical Tape 9865, Polyethylene Medical Tape 1523, Polyethylene Medical Tape 1525L, Polyethylene Medical Tape 1521, Polyethylene Medical Tape 1525L, Perforated EVA Medical Tape 1527-L, EVA/Polyethylene Medical Tape 9835, Plastic Medical Tape 9952, Single Coated Polyethylene Medical Tape 1526, Non-woven Medical Tape 1529, Polyurethane Medical Tape 9841, Polyurethane Medical Tape 9842, or Medical Tape 1527, all manufactured by and commercially available from Medical Specialties, 3M Medical Division of St. Paul, Minn., USA. The tape or film can be positioned on a release liner, wherein the adhesive layer abuts the release liner. The film can be supplied on roll of any width or length, including approximately 1500 linear feet long. The roll of film can be fed directly into the disclosed system for producing the printed articles.

Before being printed with either the digital printer, the flexographic printer, or lithographic printer, the film or substrate surface is coated with a primer to assist with the application and adherence of the ink to the substrate surface. The coating is disposed on the opposite side of the substrate surface from the adhesive layer. The coating includes a component that alters the pH and/or surface tension of the substrate surface to render the substrate surface more susceptible to receiving and retaining ink during printing of the printed articles. With respect to pH, where the pH of the coating is alkaline, the coating alters the pH of the film from a pH of about 4-5 to a pH of about 7.

To obtain optimum adhesion, the dyne level of the substrate surface exceeds the dyne level of the ink's surface tension by at least 2 dynes. In order to increase the surface energy, the molecular structure of the substrate surface has to be changed. As an example, either polypropylene (PP) or polyethylene (PE) film has a surface tension of approximately 20 to 32 dynes and conventional inks typically have a surface tension of approximately 36 to 38 dynes. In order to obtain a predetermined or desired quality adhesion to PP or PE film, the dyne level of that material can be raised to at least 38 to 40 dynes by application of the coating to the film. The coating can also raise the dyne level to at least 42 to 44 dynes for improvement of the surface tension of the film of the disclosed printed articles.

The coating can be water-soluble. The coating includes isopropyl alcohol and polyethylene imine. Specifically, the coating can include isopropyl alcohol in an amount from about 10-20% by weight of the coating and polyethylene imine in an amount from about 0.1-2.5% by weight of the coating. A suitable coating is manufactured by and commercially available from ICI Packaging Coatings, Edward Marsden Limited of Hull, England under the trademark EMICOTE 2™.

In addition to coating the substrate surface, which chemically alters the surface, the substrate surface can be physically or mechanically modified to assist with the application and adherence of the ink to the substrate surface. Physical or mechanical surface modification includes, but is not limited to, corona treatment, sputter etch, etc.

One embodiment 10 of the disclosed printed articles is depicted in FIG. 1 in an exploded side view. The printed article 10 of FIG. 1 includes a transparent film 12. Disposed on transparent film 12 is a water-soluble coating 14. A printed image 16 is printed onto and bonds with the coating 14. On the opposite side of the film 12 from the coating 14, an adhesive 18 is disposed onto the film 12. The adhesive 18 can be releasably attached or adhered to a release liner 20. The release liner 20 may be coated with an optional release liner (not shown) such as silicone or PE.

One embodiment of disclosed printed articles utilizes digital printing to create or print the desired image(s) of the temporary tattoos, decals, image, etc. on the adhesive tape. Digital printing can be characterized by a variety of ways, and is not limited to the following. Digital printing or imaging typically reads from digital files for the artwork in the printed images. Thus, digital printing provides for easy development and modification of printed images. Digital printing or imaging typically does not require film, physical plates, engraved cylinders, rolls, or photochemicals, thereby eliminating the time delay and expense of obtaining them. Additionally, the physical plates, engraved cylinders, or rolls for each different printed image do not need to be installed in the printer or imager.

Digital printing typically utilizes digital instructions, sometimes referred to as "variable data printing," for printing or imaging. Digital instructions typically include one or more of the following, but are not limited to, image colors, image spacing, image intensity, order of the color layers, etc. These digital instructions instruct the printing or imaging equipment to electronically place ink or pigment layer(s) of parts or all the printed image on a blanket and transferred to a substrate, e.g., film, release liner, or tape. The "blanket" may or may not be heated and/or magnetic. The printed image can be transferred to the substrate by color layer, partial printed image, or total printed image. The ink or pigment typically is dry in the printing or imaging machine and becomes fluid on the heated magnetic "blanket" and the color layer, partial printed image, or total printed image is electrostatically deposited on the substrate. A detailed description of the operation of a typical digital offset printer is described in Hewlett-Packard (HP) White Paper Publication, "Digital Offset Color vs. Xerography and Lithography," which is incorporated herein by reference. Specifically, an example of a digital printer that can be used to create the disclosed printed articles is HP's digital printing press Indigo Press™ 1000, 2000, 4000, or newer, presses, manufactured by and commercially available from Hewlett-Packard Company of Palo Alto, Calif., USA.

Digital printing yields fast, nearly simultaneous turn-around from print image to print image. Artwork or instructions for new or modified products can be quickly modified, even on the fly and at print speed. Digital printing provides "in-line" print registration and registration marks for converting such as die cutting, slitting and/or packaging are electronically printed or imaged. Further, digital offset printing provides rotary or semi-rotary printing and imaging. With the light sensitive photo imaging plate (PIP) in a digital printer, every pixel can be different and every impression unique. The PIP completely erases after every image strike, thereby eliminating down time for plate changes. Additionally, the digital printer of the disclosed system can be roller fed, instead of sheet fed, to produce the printed articles accurately and quickly.

Digital printing or "variable data printing" can produce printed images of up to 812 true dots per inch (DPI) or 230 line scan. Additionally, digital printing can be utilized to yield printed articles with a microprinting down to a font size of about 4 points. Additionally, digital printing can be used to apply phosphorescent, fluorescent ink, black ink, or inks with various dyes or pigments therein to the disclosed printed articles. Digital printing or imaging provides extremely high definition, detailed images. The disclosed printed articles can utilize digital printing for a variety of security printing and imaging options such as, for example, variable data printing, variable bar coding, variable image coding, security ink such as UV/black light ink layer, microprinting, lenticular printing, lenticular watermarking, copy detection patterns, digital watermarking, or security substrates, such as that used as product tampering evidence material.

Because of the accuracy with digital printing, images can be more closely abutted or spaced, as compared to other printing processes. For example, whereas the average printing process may waste about 3200 feet of excess film in one typical four color run of 6000 feet of 12-inch film, the disclosed process will only throw away about 80 feet of excess film for the same run length.

The improvement in resolution of digital printing over other types of printing is illustrated in Table 1 below.

TABLE 1

Print Image Resolution of Various Printing Techniques

| | Print Image Resolution | |
|---|---|---|
| Printing and Imaging Method | Dots Per Inch (DPI) | Lines Per Inch |
| digital | 150-812 | up to 230 |
| flexography | 300 | 60-133 |
| lithography | 300 | 150-200 |
| rotogravure | 300-600 | 30 |
| screen printing | 150 | 65-120 |

The printed articles can also be prepared by a flexographic printer/press. In a typical flexographic printing sequence, the substrate is fed into the press from a roll. An image is printed as a substrate is pulled through a series of stations, or print units. Each print unit is printing a single color. As with Gravure and Lithographic printing, the various tones and shading are achieved by overlaying four basic shades of ink, e.g., magenta, cyan, yellow, and black, with magenta being the red tones and cyan being the blue.

The major unit operations in a flexographic printing operation include image preparation, platemaking, printing, and finishing. Image preparation begins with camera-ready (mechanical) art/copy or electronically-produced art. Images are captured for printing by a camera, scanner, or computer. Components of the image are manually assembled and positioned in a printing flat when a camera is used, in a process termed "stripping." When art/copy is scanned or digitally captured, the image is assembled by the computer with special software. A simple proof (brown print) is prepared to check for position and accuracy. When color is involved, a color proof can be produced.

Flexographic and letterpress plates are made using the same basic technologies utilizing a relief type plate. Both technologies employ plates with raised images (relief) in which only the raised images come in contact with the substrate during printing. Flexographic plates are made of a flexible material, such as plastic, rubber, or ultraviolet (UV)-sensitive polymer (photopolymer), so that it can be attached to a roller or cylinder for ink application. There are three primary methods of making flexographic plates: photomechanical, photochemical and laser engraved plates.

The five types of printing presses used for flexographic printing are the stack type, central impression cylinder (CIC), in-line, newspaper unit, and dedicated 4-, 5-, or 6-color unit commercial publication flexographic presses. All five types employ a plate cylinder, a metering cylinder known as the anilox roll that applies ink to the plate, and an ink pan. Some presses use a third roller as a fountain roller and, in some cases, a doctor blade for improved ink distribution.

Flexographic inks are very similar to packaging gravure printing inks in that they are fast-drying and have a low viscosity. The inks are formulated to lie on the surface of nonabsorbent substrates and solidify when solvents are removed. Solvents are removed with heat, unless UV-curable inks are used.

After printing, the substrate may run through a number of operations to be "finished" and ready for shipment to the customer. Finishing may include operations such as coating, cutting, folding, and binding. The disclosed printed articles are prepared by applying a coating to the substrate surface. The coating is then cured, for example, by radiant heat, ambient air, forced air, UV exposure, and/or other suitable curing methods. The coating can be optionally cured in a curing apparatus, such as the Omega DigiconS™ for ambient, radiant, etc. type of curing.

Optionally, the coated and cured adhesive material can be rolled onto a sheet that can be directly fed through a digital or flexographic printer or it can be stored for up to approximately three months before printing. The coated adhesive is then subjected to flexographic or digital offset printing. The printed adhesive is then die cut using, for example, a rotary or semi-rotary die cut machine or other die cutting apparatus. Any undesirable or excess film (also referred to as "waste removed" or "excess matrix") can be optionally stripped or peeled away from the die cut film. Optionally, the rolls of printed, die cut film can be slit in the longitudinal direction of the roll into smaller rolls for packaging and/or sale to a consumer.

Alternatively, the film can be die cut to pre-determined specifications and the excess film removed first before printing. This particular process order is suitable for standard digital printing, as opposed to offset printing.

Figure 2:
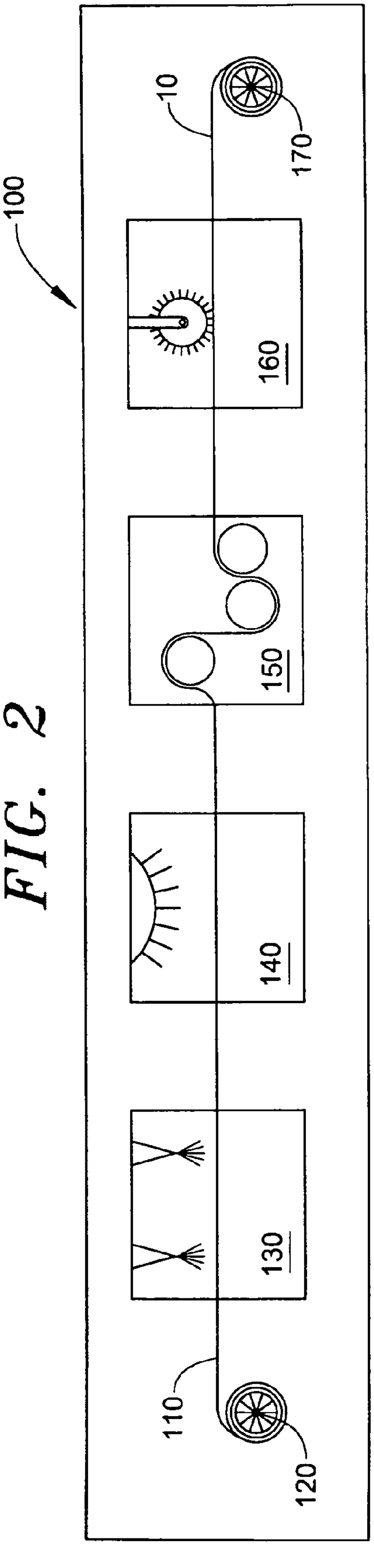
FIG. 2 is a side view of a block diagram of an embodiment of system for producing the exemplary printed article of FIG. 1.

Also disclosed are systems for producing or creating the disclosed printed articles. One embodiment 100 of the disclosed system is illustrated in the block diagram of FIG. 2. The system 100 includes a supply roll 120 that supplies a transparent film 110 to a coating application apparatus 130. The coating application apparatus 130 is configured to coat the transparent film 110 with a pressure-sensitive adhesive on the opposite side of the film from the adhesive. The system 100 further includes a printer 150 in line (as in an assembly line) with the coating application apparatus 130. The system 100 can further include an optional curing apparatus 140 in line between the coating application apparatus 130 and the printer 150. The system 100 can also include an optional die cutting apparatus 160 in line after the printer 150. After the optional die cutting apparatus 160, and after the printer 150, a take-up roll 170 may be used to roll up the tape with the printed articles 10 thereon. The printer 150 can be a digital printer, a digital offset printer, or a flexographic printer.

The process for producing the disclosed printed articles may also include a finishing or converting process to produce the printed articles. The finishing or converting process can be accomplished by a variety of equipment manufacturers and processes. The processes include, but are not limited to, flat bed die cutting, semi-rotary die cutting, rotary die cutting, continuous or step and repeat die cutting, etc. The finishing or converting process may include laminating, liner swaps, and waste removal or matrix removal. Examples of finishing or converting process equipment include that is manufactured by Mark Andy, Delta, AB Graphic International (Omega Systems), etc.

It should be emphasized that the above-described embodiments of the printed articles, methods, and systems for producing the same are merely possible examples of implementations of the printed articles, methods, and systems, and are merely set forth for a clear understanding of the principles set forth herein. Many variations and modifications may be made to the printed articles, methods, and systems without departing substantially from the spirit and principles of the disclosure. All such modifications and variations are intended to be included herein within the scope of this disclosure and protected by the following claims.

The invention claimed is:

1. A method comprising:

providing a substantially transparent film having a first side and a second side;

applying a coating material to the first side of the film, the coating material having a first glass transition temperature;

curing the coating material by a process using one of radiant heat and ultraviolet light;

heating the coating material above the first glass transition temperature;

printing on the first side of the film using an ink having a second glass transition temperature that is higher than the first glass transition temperature, wherein printing the image comprises printing an image using a digital offset printer; and coating the second side of the film with a pressure-sensitive acrylate adhesive.

2. The method of claim 1, further comprising printing an image on the first side of the film, the image having a line quality of greater than or equal to about 100 lines per inch.

3. The method of claim 1, further comprising printing an image on the first side of the film, the image having a line quality of greater than or equal to about 230 lines per inch.

4. The method of claim 1, further comprising printing an image on the first side of the film, the image having a resolution greater than or equal to about 300 dots per inch.

5. The method of claim 1, further comprising printing an image on the first side of the film, the image having a resolution in the range of about 300 dots per inch to about 812 dots per inch.

6. The method of claim 1, further comprising printing an image on the first side of the film, the image having a resolution of about 812 dots per inch.

7. The method of claim 1, further comprising printing an image on the first side of the film, the image having alphanumeric characters with a font of greater than or equal to 4 points.

8. The method of claim 1, wherein the coming material altars the pH of the film.

9. The method of claim 1, wherein the coating material altars the dyne level of the film.

10. The method of claim 1, wherein the pressure-sensitive acrylate adhesive is hypoallergenic.

11. A method comprising:

providing a substantially transparent film having a first side and a second side;

coating the first side of the film with a primer that facilitates an application of a printed image on the first side of the film, wherein printing the image comprises printing an image using a digital offset printer;

physically modifying the surface of the first side of the film;

heating the primer above a glass transition temperature of the primer;

applying a printed image on the first side of the film while the temperature of the primer is above the glass transition temperature of the primer;

coating the second side of the film with a pressure-sensitive acrylate adhesive that facilitates a temporary application of the film to a material selected from the group consisting of skin, glass, paper, wood, plastic, metal, fabric, and neoprene;

cutting the film in a longitudinal direction to remove excess material; and feeding the film onto a spool.

12. The method of claim 11, wherein physically modifying the surface of the first side of the film comprises a corona treatment.

13. The method of claim 11, wherein physically modifying the surface of the first side of the film comprises sputter etching.

14. The method of claim 11, further comprising disposing a release liner on the second side of the film.

15. The method of claim 11, further comprising:

printing an image on the first side of the film to create a printed article.

16. The method of claim 15, wherein printing the image comprises printing an image using a flexographic printer.

17. The method of claim 15, wherein printing the image comprises printing an image with an ink selected from the group consisting of: phosphorescent ink, fluorescent ink, dye-based ink, pigment-based ink, color ink, black ink, and combinations thereof.

18. The method of claim 15, wherein the printed article is selected from the group consisting of a camouflage, a temporary tattoo, a decal, surgical instruction, corporate advertising, a bar code, a security device, a watermark, and combinations thereof.

19. The method of claim 15, wherein the printed article has a resolution of about 812 dots per inch and a line quality of about 230 lines per inch.

20. The method of claim 11, wherein the pressure-sensitive acrylate adhesive is hypoallergenic.

21. The method of claim 11, wherein the primer comprises isopropyl alcohol and polyethylene imine.

22. The method of claim 21, wherein the primer comprises isopropyl alcohol in an amount of about 10-20% by weight of the primer and polyethylene imine in an amount from about 0.1-2.5% by weight of the primer.

23. The method of claim 11, wherein the primer is water-soluble.

24. A method of producing printed articles, comprising the steps of:

printing a first side of a transparent film, wherein the film further includes a second side coated with a pressure-sensitive acrylate adhesive;

applying a release liner to the adhesive;

coating the first side with a coating before printing the first side, wherein the coating has a glass transition temperature lower than that of ink applied on the first side of the transparent film during a digital printing process;

curing the coating by a method chosen from: radiant heat, ambient air, forced air flow, and ultraviolet light;

heating the coating above its glass transition temperature during printing, whereby the coating bonds to ink dispersed in the printing process;

die-cutting the printed articles;

peeling away excess film from the printed articles;

cutting the release liner and the adhesive of the printed articles in the longitudinal direction of feed of the printed articles; and rolling the printed articles onto a spool.

25. The method of claim 24, wherein the printed article is chosen from: camouflage, a temporary tattoo, a decal, surgical instruction, corporate advertising, a bar code, a security device, a watermark, and combinations thereof.

26. The method of claim 24, wherein the transparent film is chosen from one of: polyester, polyurethane, ethylene vinyl acetate (EVA), coextruded EVA and white polyethylene, and moisture vapor permeable polyurethane (PU) plastic.

27. The method of claim 24, wherein the adhesive is hypoallergenic.

28. The method article of claim 24, further comprising printing the first side with an image having a resolution greater than or equal to approximately 300 dots per inch.

29. The method of claim 24, further comprising printing the first side with an image having a line quality greater than or equal to approximately 100 lines per inch.

30. The method of claim 24, further comprising printing the first side with alphanumeric lettering having a font greater than or equal to 4 points.

31. The method of claim 24, further comprising printing the first side with a digital offset printer.

32. The method of claim 24, further comprising printing the first side with a flexographic printer.

33. The method of claim 24, further comprising printing the first side with an ink chosen from: phosphorescent, fluorescent, color, and black, and combinations thereof.

34. The method of claim 24, wherein the coating comprises:

isopropyl alcohol; and polyethylene imine.

35. The method of claim 34, wherein the coating comprises:

isopropyl alcohol in an amount from about 10-20% by weight of the coating; and polyethylene imine in an amount from about 0.1-2.5% by weight of the coating.

36. The method of claim 24, wherein the coating facilitates imaging of the printed article by a digital printer.

37. The method of claim 24, wherein the coating facilitates imaging of the printed article by a flexographic printer.

38. The method of claim 24, wherein the coating alters the pH of the film to thereby enable the film to be more receptive to the ink.

39. The method of claim 38, wherein the coating alters the pH of the film from a pH of about 4-5 to a pH of about 7.

40. The method of claim 24, wherein the coating comprises a component that increases the surface tension of the film to thereby enable the film to be more receptive to the ink.

41. The method of claim 24, wherein the coating comprises a component that alters the surface tension of the film from about 20-32 dynes to about 42-44 dynes.

42. The method of claim 24, wherein the coating is water-soluble.

43. The method of claim 24, further comprising:

providing the film on a roll; and paying off the film from the roll directly in a printer.

* * * * *